Apr. 3, 1923.
I. D. SHAW.
FASTENER.
FILED JUNE 4, 1921.
1,450,391.
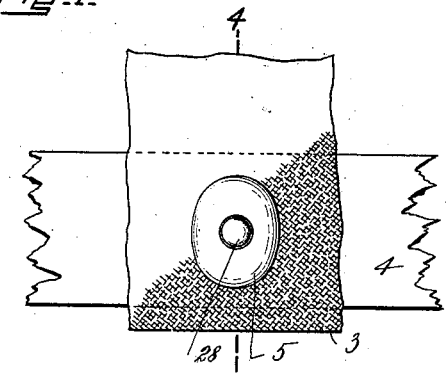
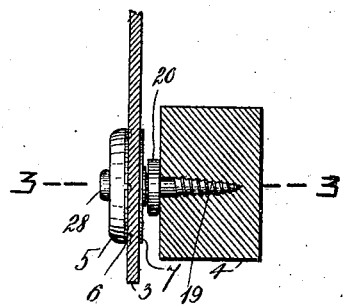
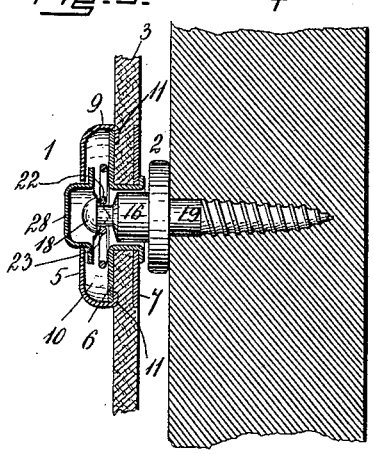
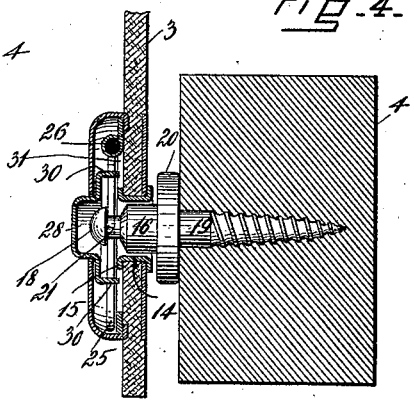
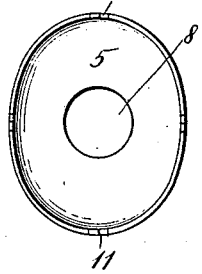
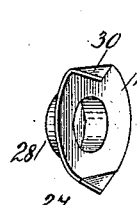
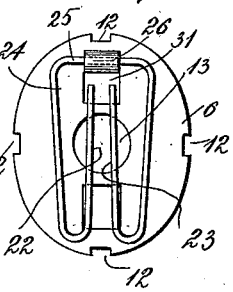
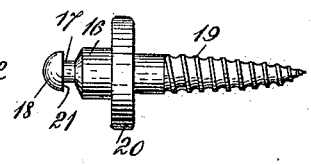
INVENTOR:
Ira D. Shaw
By Coale H Hayes
ATTORNEYS.

Patented Apr. 3, 1923.

1,450,391

UNITED STATES PATENT OFFICE.

IRA D. SHAW, OF BOSTON, MASSACHUSETTS.

FASTENER.

Application filed June 4, 1921. Serial No. 475,054.

*To all whom it may concern:*

Be it known that I, IRA D. SHAW, of Boston, in the county of Suffolk and State of Massachusetts, a citizen of the United States, have invented a new and useful Improvement in Fasteners, of which the following is a full, clear, and exact description, reference being had to the accompanying drawings, forming a part of this specification in explaining its nature.

The present invention relates to a stud and socket fastener for holding parts of materials of all kinds where such type of fastener is desired. The fastener is especially adaptable for those purposes where a strong and secure fastening is needed, as for example, for supporting the sides or curtains of automobiles and in situations of a similar character.

The object of my invention is to provide a fastener of the above described type the elements of which are easily formed and assembled and readily attachable to the materials or parts to be connected.

The invention can best be seen and understood by reference to the drawings, in which—

Figure 1 is a plan of the fastener, the same being shown connecting separate parts.

Fig. 2 is a side elevation thereof, the part to which the stud is secured being shown in section.

Fig. 3 is a section on line 3—3 of Fig. 2.

Fig. 4 is a section on line 4—4 of Fig. 1.

Fig. 5 is a plan of the interior of one of the shell or casing-forming elements of the socket member of the fastener.

Fig. 6 is a perspective of the stud-releasing element of the fastener which forms a part of the socket member.

Fig. 7 is a plan of another of the socket members with attached spring for holding the stud in place.

Fig. 8 is a side elevation of the stud member of the fastener.

Referring to the drawings:—

The fastener consists of a socket member 1 which is attached to one of the parts to be fastened together, and a stud member 2 attachable to the other part. 3 and 4, represent, respectively, parts or materials to which the respective stud and socket members are secured.

The body or shell of the socket member comprises a chamber-forming portion which contains certain of the operating parts later to be referred to and an attaching portion. The body is made up of separate plates consisting of a face plate 5, an intermediate plate 6 and a back plate 7. Of these plates the intermediate plate 6 is common to both the chamber-forming portion and the attaching portion of the socket member, the face plate 5 co-operating with it to form the chambered portion of the member and the back plate 7 co-operating with it to form the attaching portion.

The face plate 5 has within it a central opening 8. Around its outer edge the plate is provided with a turned edge or flange 9 which extends to bear against the plate 6 around and just adjacent the outer edge thereof. By means of this flange the plates 5 and 6 are separated from each other and form the chamber 10 of the socket member. The flange 9 of the plate 5 is provided with a number of edge clips 11 which pass through slots 12 formed in the edge of the plate 6 and are turned and clenched back of this plate for holding the plates 5 and 6 together.

The intermediate plate 6 is provided with a central opening 13 from and around which there extends a hollow tubular shank 14. This shank passes through an opening formed in the part or material 3 to which the socket member is secured and through an opening in the back plate 7. The end 15 of the shank is turned outwardly to bear against the back plate around the opening in it in the manner of a rivet with the effect of drawing the two plates 6 and 7 together and thereby binding the material 3 between them.

The stud member 2 comprises a body portion 16 from which extends a contracted neck portion 17 and beyond this a head 18. These parts are carried by a screw-threaded shank 19 by which the stud member is secured to the part 4 of the parts to be connected. The shank 19 is provided with an annular flange 20 which bears against the face of the part 4 when the shank has become properly seated. The neck portion 17 of the stud presents a relatively narrow contraction. From the neck the enlargement of the head is so abrupt as to form a sharply defined edge 21 on the under side of the head. The top of the head is rounded. When the stud and socket members are brought together the body 16 of the stud will fit snugly within the hollow of the shank 14 to the socket member. The neck portion 17 of the stud will extend into the chamber 10 of the socket member and the head of the stud will likewise be contained within this chamber. When the stud and socket members are thus brought together a releasable retention of the members is obtained as follows:—

Contained within the chamber 10 of the socket member is a set of spring arms 22, 23, respectively. These arms form the free ends of a spring wire 24. This wire is bent along its middle to form an end piece 25 from which the wire is further bent that its free ends may provide the arms 22, 23 as aforesaid. The wire 24 rests upon the plate 6 of the socket member and is preferably held in place by a clip 26 cut from the body of the plate 6 and bent around the end piece 25 of the wire, thereby securely holding it in place. When the wire is thus secured the arms 22, 23 will extend substantially parallel with one another over the opening in the plate 6, the arms being normally separated from one another a distance less than the width of the head to the stud member and about equal to the width or diameter of the neck portion thereof. When the stud member is applied to the socket member the rounding head of the stud will engage these arms and spread the same, the arms slipping from off the head to engage the neck portion of the stud and lie beneath the edge 21 of the head. When thus disposed the arms will prevent separation of the stud from the socket member until such time as the arms are spread sufficiently to permit the withdrawal of the head to the stud.

For the purpose of spreading the arms 22, 23 to release the head and permit of the withdrawal of the stud, there is provided a member 27, this member normally assisting, also, in the retention of the wire 24 and arms carried by it as will later be explained.

The member 27 is a member preferably struck up from a blank and comprises a hollow crown portion 28 from which extends a flange-forming edge or rim 29 provided at its opposite ends with downturned wedge-shaped projections 30. When in place the crown-forming portion 28 of the member 27 lies within and extends upwardly through the opening 8 in the plate 5 of the socket member. The crown rises so far above the face of the plate 5 as to permit of the depression of the member through application of pressure by the thumb or finger, the crown thus forming a thumb piece. The rim 29 extends in the manner of a flange outwardly beneath the plate 5 around the opening in it, thereby preventing withdrawal of the member 27. The wedge-shaped projections 30 fit downwardly between the spring arms 22, 23, the projections engaging the arms at points so far separated from one another as not to interfere with the insertion of the head of the stud between the arms as previously described. The form and arrangement of the projections and their disposition in relation to the arms are also such that in the undepressed position of the member the edge or rim 29 will be held in engagement with the inner face of the plate 5 around the opening in it while the projections 30 will assist in holding the wire 24 and arms 22, 23 formed by it snugly in place against the face of the plate 6 and will prevent the arms and wire being lifted upon the insertion of the stud.

After the members have been brought together the head of the stud is released from the arms through an application of pressure by the thumb or finger to the crown portion or thumb piece 28 of the member 27, this action operating to depress the member when the wedge-shaped projections 30 thereof will operate to separate the arms 22, 23 sufficiently to permit of the release and withdrawal of the head to the stud member. After the withdrawal of the head to the stud member and release of pressure from the member 27 the arms will resume their normal position and thereby act to elevate the member 27 and return it to the normal position occupied by it as above explained.

In further relation to the depressible member 27, it will be observed that its crown portion 28 fits rather snugly within the opening in the top of the casing and thereby assists in the positioning of the entire member, the fit of the crown in the opening permitting, however, of movement therein as aforesaid inasmuch as the wedge shaped projections 30 fit normally between the separable arms 22, 23. These arms accordingly, through engagement with the wedge-shaped projections, prevent rotary displacement of the member 27. To permit of the unobstructed movement of the projections 27 downwardly between the arms 22, 23, when the member 27 is depressed, the plate 6 of the socket member is provided with openings in it 31 located beneath the projections 30, one of these openings being the opening left from the bending up of the metal for forming the clip 26 above referred to.

Having thus fully described my invention, I claim and desire to secure by Letters Patent of the United States:—

1. In a fastener, a stud member having an attaching head, a socket member having a casing with aligned openings in the top and bottom thereof, a resilient jaw within the casing for receiving and holding the head of the stud member introduced into the casing through the opening in the bottom thereof on combining said members, and a depressible member having a hollow crown forming a thumbpiece extending through the opening in the top of the casing and depressible from outside the casing, said depressible member having also a flange interposed between the jaw and the top of the casing adjacent the opening in it, and a part carried by said flange and operating to open said jaw when said depressible member is depressed by application of pressure to the thumbpiece.

2. In a fastener, a stud member having an attaching head, a socket member having a casing with aligned openings in the top and bottom thereof, a resilient jaw within the casing for receiving and holding the head of the stud member introduced into the casing through the opening in the bottom thereof on combining said members, and a depressible member having a hollow crown forming a thumbpiece extending through the opening in the top of the casing and depressible from outside the casing, said depressible member having also a flange interposed between the jaw and the top of the casing adjacent the opening in it and parts extending from said flange to engage said jaw on opposite sides of the head of the stud member when the members are combined and operating to open said jaw for releasing the head of the stud when said depressible member is depressed by application of pressure to the thumbpiece.

3. In a fastener, a stud member having an attaching head, a socket member having a casing with aligned openings in the top and bottom thereof, means within the casing comprising spring arms arranged to receive and hold the head of the stud member introduced into the casing through the opening in the bottom thereof on combining said members, and a depressible member having a hollow crown forming a thumbpiece extending through the opening in the top of the casing and depressible from outside the casing, said depressible member having a flange extending from said thumbpiece and located inside the casing between the spring arms and the top of the casing adjacent the opening therein and separate wedge-forming parts extending from said flange on opposite sides of the head of the stud member when the members are combined, and operating to spread said arms for releasing the head of the stud when said depressible member is depressed by application of pressure to the thumbpiece.

IRA D. SHAW.